Figure 5:
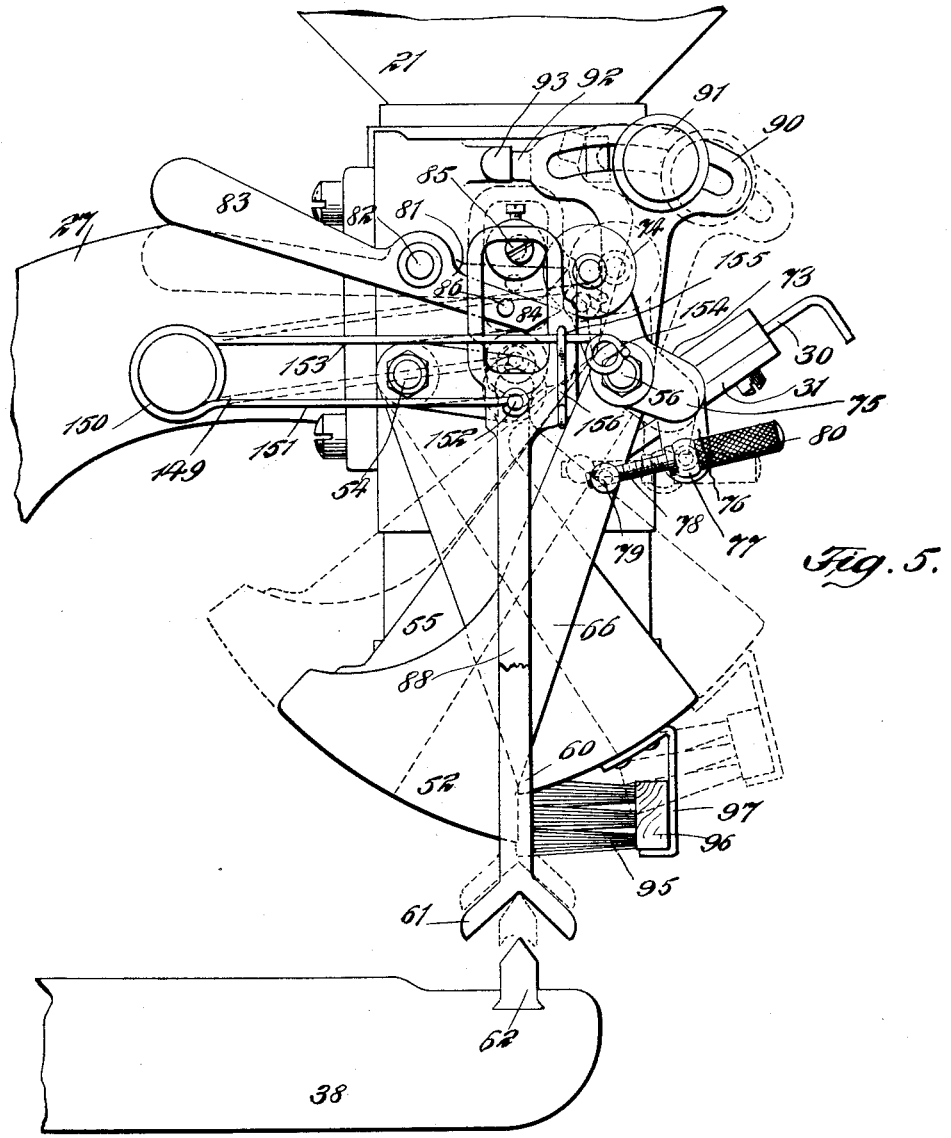

H. G. DEWEY.
WEIGHING MACHINE.
APPLICATION FILED APR. 18, 1910.
1,107,592.
Patented Aug. 18, 1914.
7 SHEETS—SHEET 1.
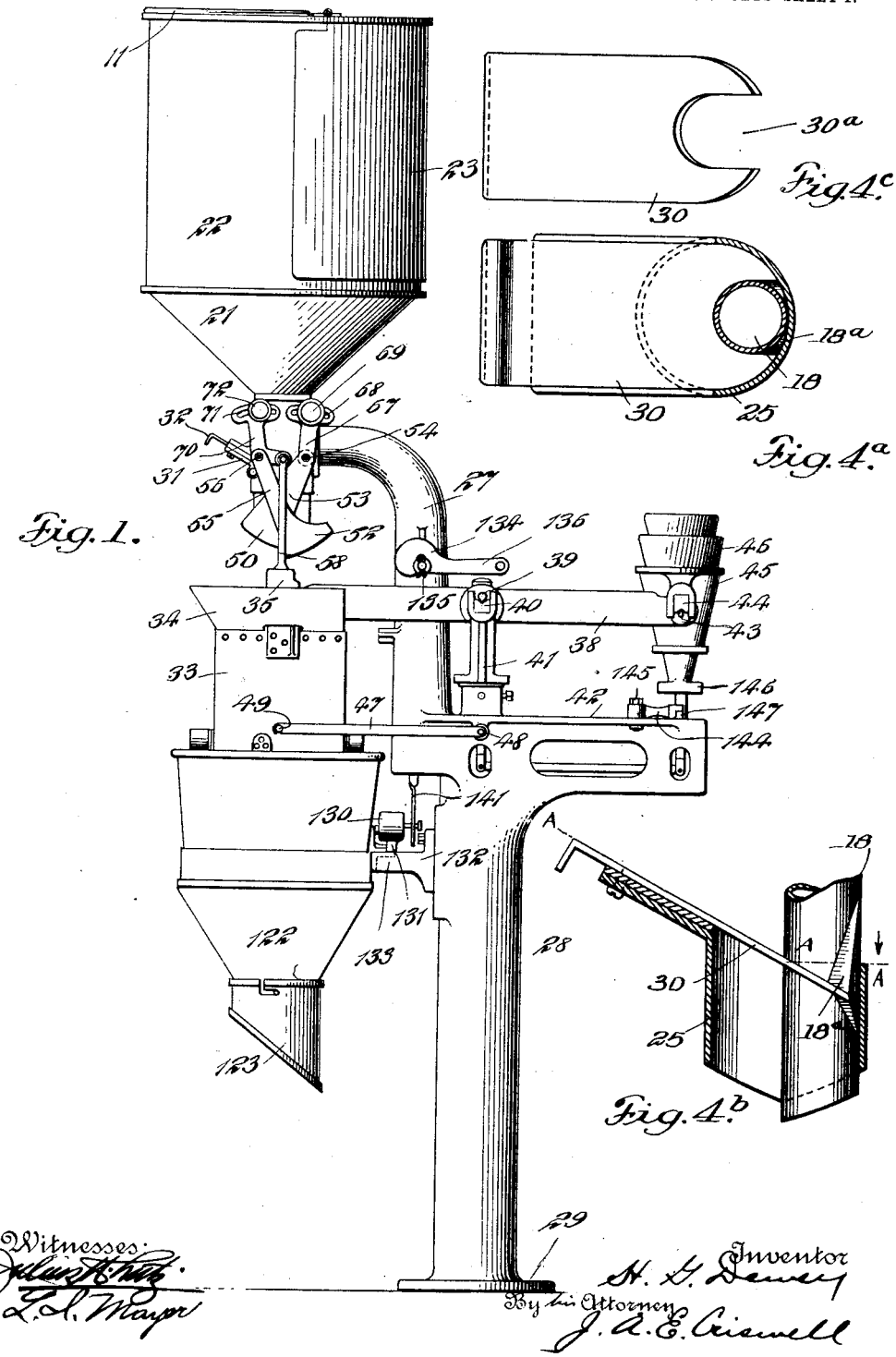

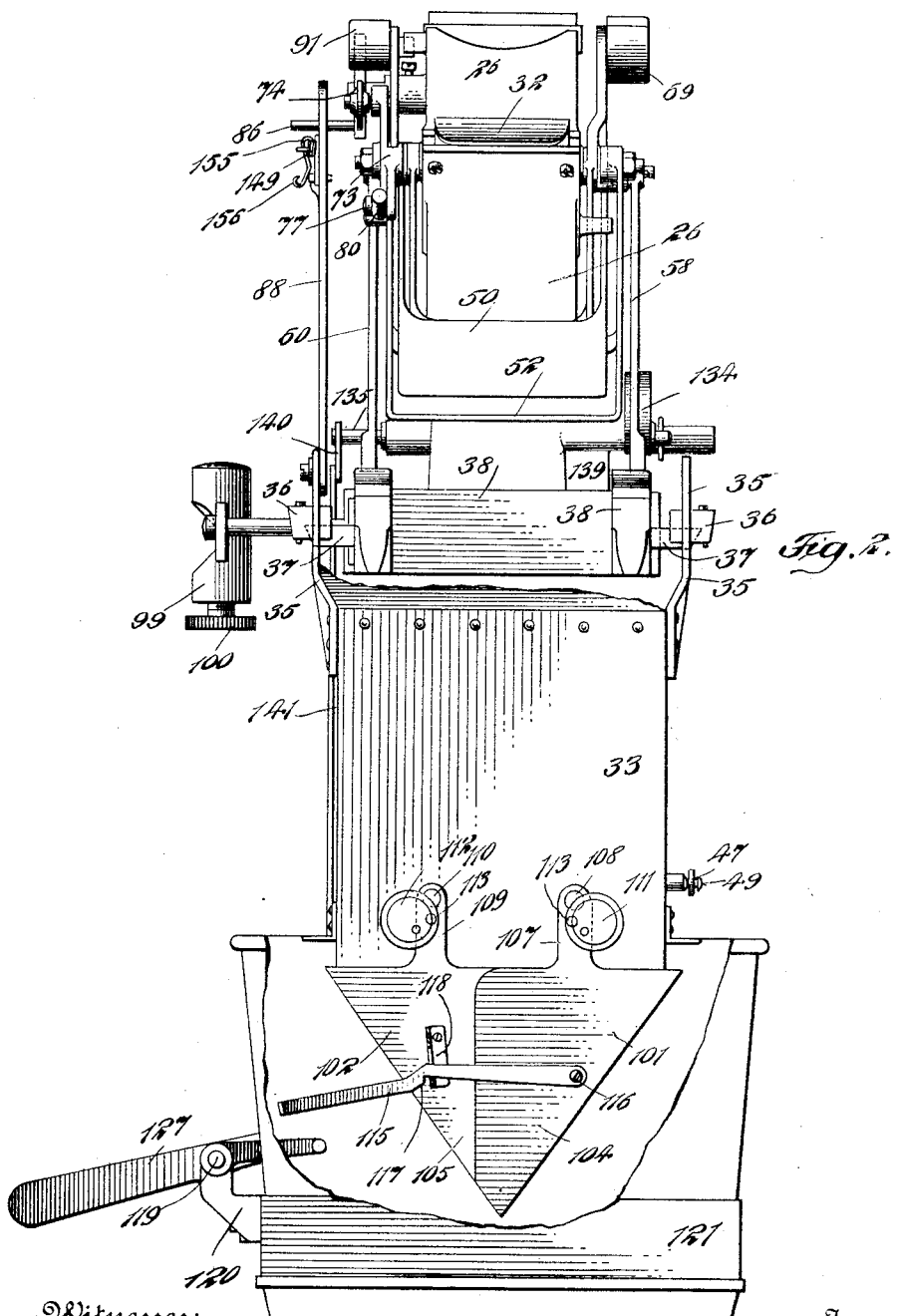

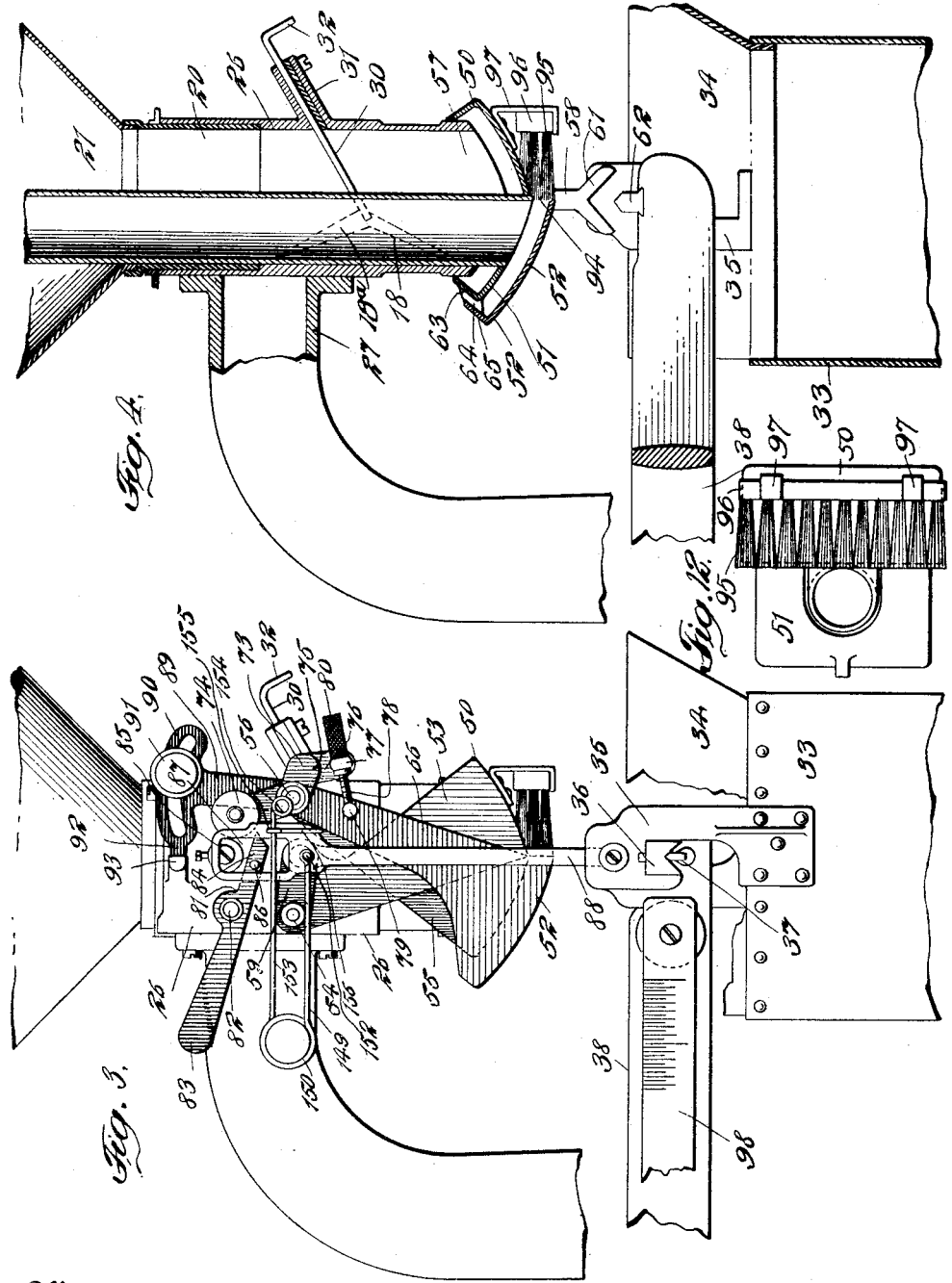

H. G. DEWEY.
WEIGHING MACHINE.
APPLICATION FILED APR. 18, 1910.
1,107,592.
Patented Aug. 18, 1914.
7 SHEETS—SHEET 5.
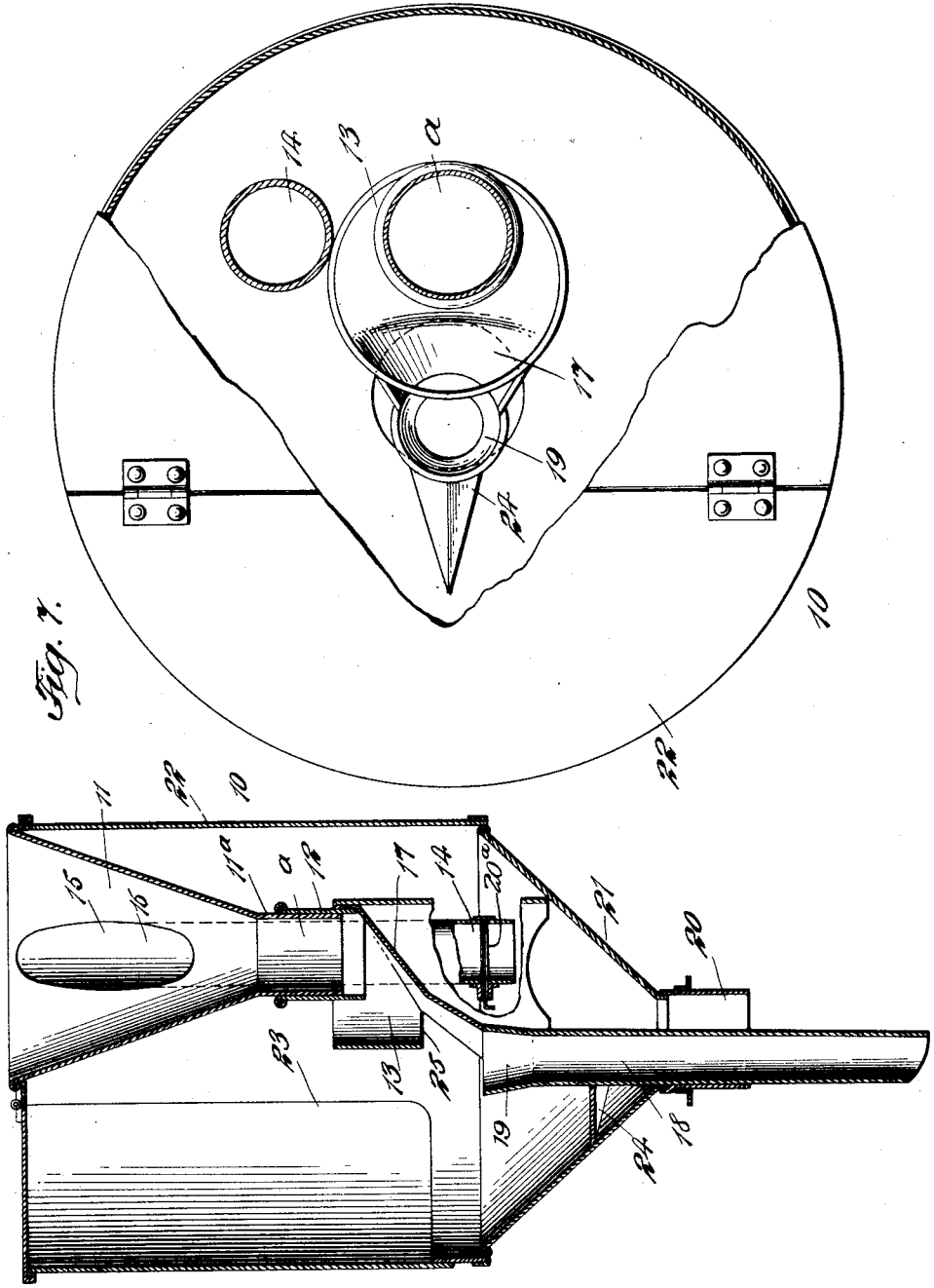

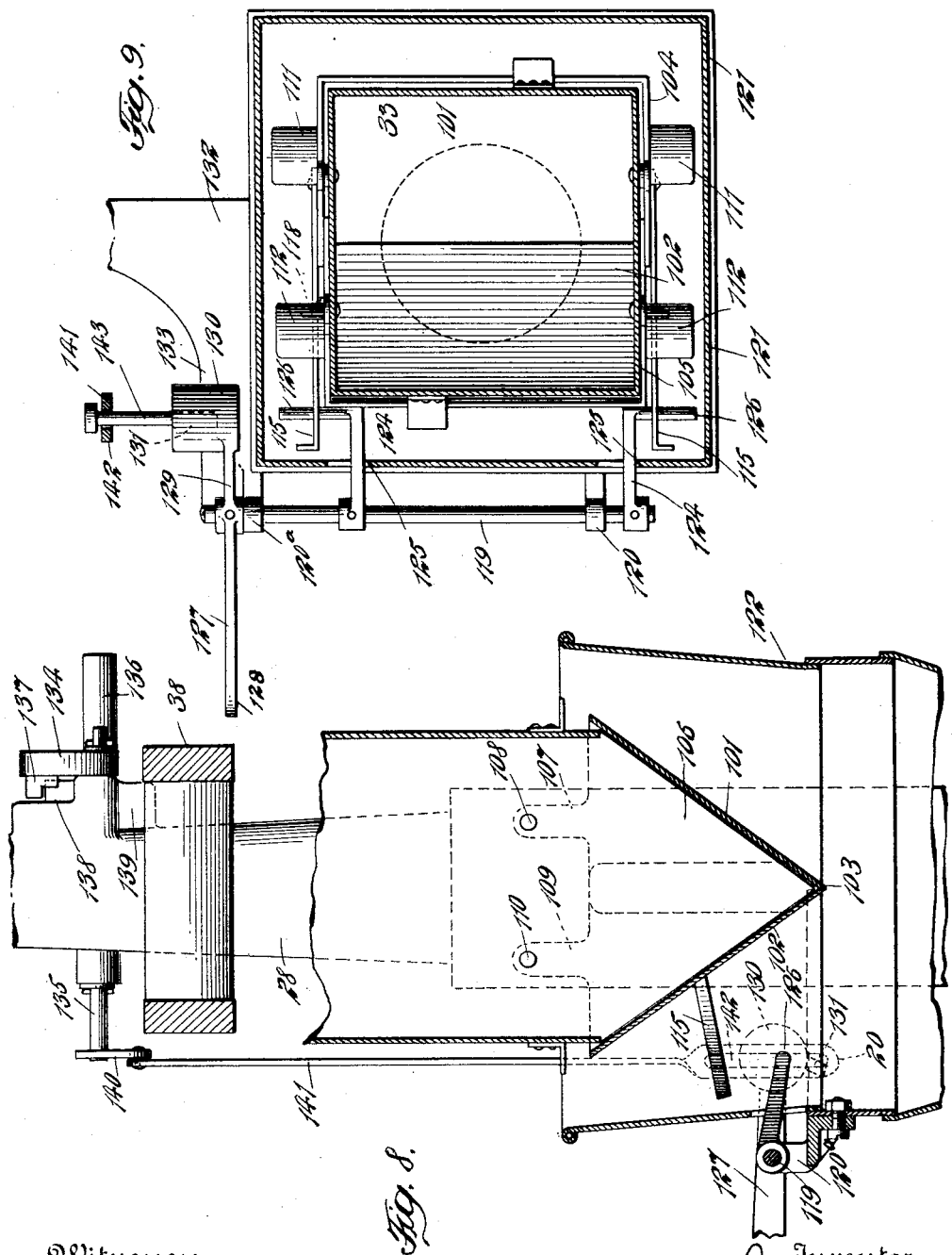

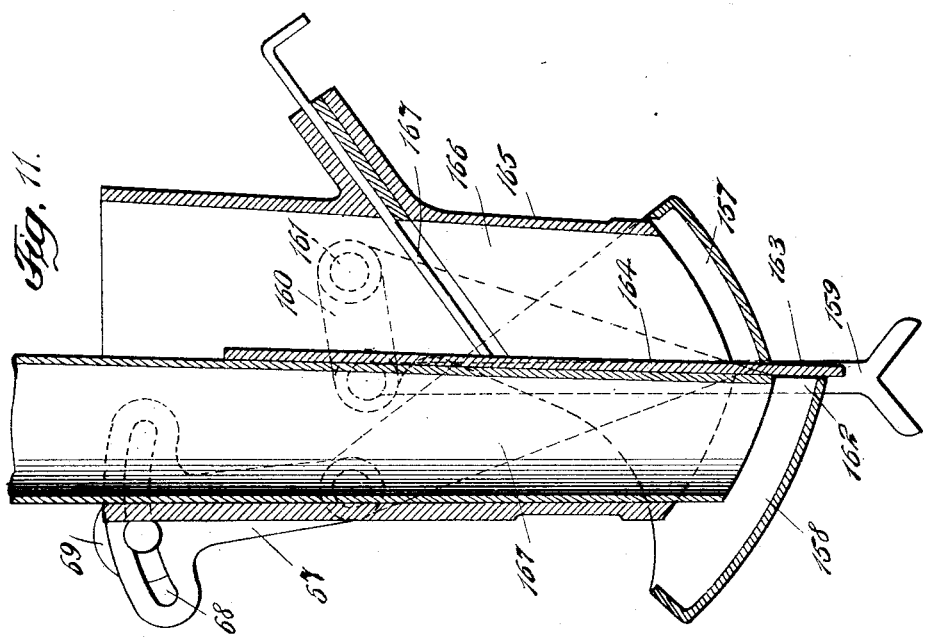
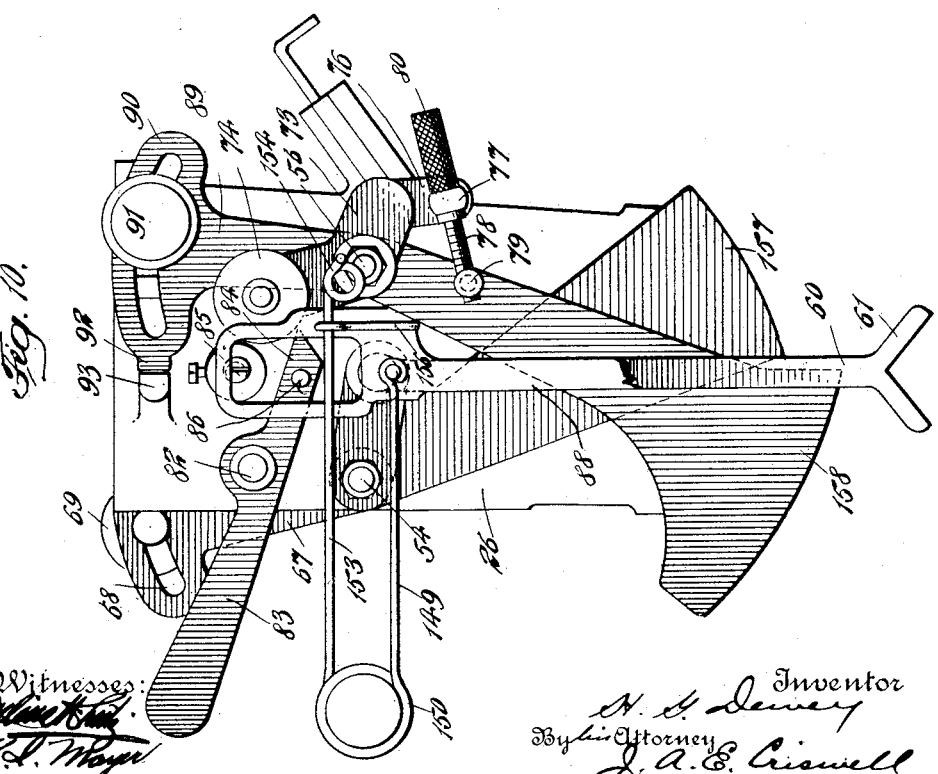

UNITED STATES PATENT OFFICE.

HAYWOOD GUION DEWEY, OF NEWARK, NEW JERSEY.

WEIGHING-MACHINE.

1,107,592.  Specification of Letters Patent.  Patented Aug. 18, 1914.

Application filed April 18, 1910. Serial No. 556,128.

*To all whom it may concern:*

Be it known that I, HAYWOOD GUION DEWEY, a citizen of the United States, and a resident of Newark, county of Essex, and State of New Jersey, have invented certain new and useful Improvements in Weighing-Machines, of which the following is a full, clear, and exact description.

This invention relates more particularly to automatic weighing machines of the gravity type for weighing different kinds of materials.

The primary object of the invention is to provide a simple and efficient machine in which the material to be weighed may be caused to pass to the bucket in two streams which are so controlled that definite quantities may be accurately weighed and the weighed drafts automatically discharged into packages adapted to contain the same.

Other objects of the invention are to provide a machine which may be quickly and easily set for different weights and which will weigh various kinds of material at a rapid speed; to provide a machine which requires no power and no mechanical operating means of any kind; to provide a machine in which units or drafts may be weighed of less than one pound or more than a pound; to provide a machine in which only one adjustment is required to change the weights; to provide a machine which can be easily set up and operated by unskilled help; and to provide a machine which is simple in operation requiring no manual aid from the girl or other person attending to the machine.

Another object of the invention is to provide a machine which can be run at various speeds ranging from one draft per minute to twenty drafts or more per minute, and to provide a machine in which the weighing may be accomplished through a preliminary stream and the weighing completed by a fine drip stream, or the machine made to weigh by a single stream only.

A further object of the invention is to provide a simple and efficient hopper in which the material is not likely to choke or pack no matter what the character of the material nor how intermittently the machine is operated, and at the same time provide a hopper which is effective to supply the material to the weighing mechanism.

A further object of the invention is to provide a machine which is very compact and requires a minimum amount of space while in use, and which may be made portable or stationary as desired.

A still further object of the invention is to provide a machine in which the weight of the units or parts will be substantially uniform; to provide simple means for compensating for the material in transit or in the air during the weighing operation; and to provide means which are sensitive and quick of operation without being likely to get out of order while in use.

With these and other objects in view, the invention will be hereinafter more particularly described with reference to the accompanying drawings, which form a part of this specification, and will then be pointed out in the claims at the end of the description.

In the drawings, Figure 1 is a side elevation of one form of machine embodying my invention. Fig. 2 is an enlarged front elevation, partly broken away and parts thereof removed for the purpose of better illustrating certain features of the invention. Fig. 3 is a fragmentary side elevation of the upper part of the machine looking from the side opposite to that shown in Fig. 1. Fig. 4 is a vertical section through the hopper and valves showing a part of the bucket and weighing beam. Fig. 4$^a$ is a fragmentary plan view showing how one of the cut-off valves is adapted to fit about the conduit of the finishing stream. Figs. 4$^b$ and 4$^c$ are fragmentary detail views of the cut off valve. Fig. 5 is an enlarged side elevation, partly broken away, of the upper part of the machine, the valves being shown in dotted lines in an open position. Fig. 6 is an enlarged sectional view of the hopper, showing how the material is divided into a preliminary and a finishing stream. Fig. 7 is an enlarged plan view of the hopper, a part of which is broken away to show the interior thereof. Fig. 8 is an enlarged fragmentary section, partly in elevation, showing the discharge end of the machine. Fig. 9 is a sectional plan view showing the mechanism for operating the discharge doors. Fig. 10 is an enlarged side elevation of a different form of hopper throat and valves for controlling the material. Fig. 11 is a vertical section through the hopper throat showing how the same may be divided and the preliminary stream cut off; and Fig. 12 is a fragmentary inverted plan showing how the primary valves are adapted to fit about the conduit for the finishing stream.

While I shall show a general arrangement and construction of machine adapted for weighing certain materials, it will be understood that the machine may be variously constructed and that some of the parts may be used in connection with other styles of weighing or like machines without departing from the character of the invention.

The material to be weighed, as coffee in the bean for example, is fed to a hopper 10. This hopper has a funnel-shaped member 11, the throat 11a of which is provided with a sleeve 12 adapted to have its lower end fit into the mouth of a cylindrical member 13. At the side of the member 13 is a pipe or conduit 14, the upper end 15 of which communicates with the interior of the funnel 11 through the opening 16 to cause a part of the material to be weighed to pass into said conduit 14 to provide a preliminary or primary stream in weighing the material. An inclined plate or device 17 extends from the discharge end of the sleeve 12 to the mouth of a tubular conduit or pipe 18, the mouth of which is flared, as at 19, and into which a part of the material is directed for what is termed the drip or finishing stream. The conduit 18 for the finishing stream passes through a sleeve or cylinder 20 forming the throat of a spill pan 21. This pan is conical and serves as a means for directing the preliminary stream into the throat 20, and arranged above the spill pan 21 so as to surround and inclose the hopper, is a cylindrical casing 22 having a door or part 23 by which access may be had to the interior of the hopper, and at the same time incase the hopper in such a way that the construction thereof is not easily seen. The hopper and other parts mentioned may be of sheet metal or other material, and extending on one side of the conduit 18 is an angular plate 24 which serves to direct any overflow of material from the mouth 19 of the conduit 18 into the sleeve or discharge member 20 to join the preliminary stream. The angle of the inclined plate 17 is made to suit the natural angle taken by the flow of the material to be handled and is known as "the angle of the natural slope." The mouthpiece 19 is of such capacity that the quantity of material it will hold will always flow freely and naturally through the feed member or conduit 18 without choking. The notch 25 in the cylinder or member 13 is cut just high enough to clear the surface of flowing material being conveyed or guided into the mouth 19 by the inclined surface of the plate 17. This prevents the material from overflowing or continuing to flow through the throat 11 when the flow is stopped entirely or partly by any interference with the bottom end of the pipe or feed member 18. It will be seen from this that a very uniform and constant flow of material is obtained and that the flow may be stopped partly or checked wholly by any device and again started immediately by simply removing the obstruction. That is an intermittent flow may be maintained from the funnel through the feed member 18 without choking or bridging the material when the flow is choked or stopped temporarily, as when a filling or weighing machine cuts off in making weight or measuring a predetermined quantity. It will be seen further that either one intermittent stream may be obtained by the device or one constant or one intermittent stream at the same time by checking the feed conduit 18 or the preliminary stream which flows through the sleeve 20, there being a stop valve 20a provided within the conduit 14 if desired in order to leave a free opening at all times in the discharge end of the sleeve 20.

The sleeve 20 forming the discharge portion of the spill pan 21 is adapted to fit into the upper end of a casing 26 forming a conveyer for the preliminary stream and a throat and supporting means for the hopper and finishing feed conduit 18, and said casing 26 is supported on the upper end 27 of the frame 28, the lower part of which is provided with a base 29 serving to properly support the machine, though instead of the form of the frame shown, this may be of any suitable construction and may be mounted in such a way as to be portable instead of fixed on a bench, table or other support, if desired. A slide or gate 30 is movably held in a projecting portion 31 of the casing 26, and said slide is angularly arranged and provided with a handle portion 32. The slide is intended to partly or wholly cut off the main or preliminary stream of material so that the two streams may be employed in weighing the material or only the finishing stream according to the material being handled. The slide 30 is adapted to fit around and about the conduit 18 and for this purpose it is provided with a recessed portion in the end thereof to fit about the conduit 18.

A bucket 33 is adapted to receive the material being weighed, and this bucket is adapted to be supported so as to have a vertical movement by any suitable means. As shown, the bucket is substantially rectangular in cross-section and is provided with a flared mouth or funnel portion 34 to direct the material into the bucket, and secured to the opposite sides of the bucket are the bails 35 provided with the blocks 36 which rest upon the knife-edged elements 37 carried by the beam 38. This beam 38 is adapted to span the upper portion 27 of the machine frame, and at one end enters the mouth 34 of the bucket 33. The beam is supported intermediate its end by knife-edged elements 39 located on opposite sides thereof and resting on the blocks 40 mounted on the brackets 41. The brackets 41 are held upon a horizontally-extending bed 42 of the machine frame, and at the other end of said beam are the knife-edged elements 43 which engage the blocks 44 of the weight-holding member 45, the latter being adapted to receive one or more weights 46 according to the weight of the drafts or quantities of material. The bucket 33 will thus have an oscillatory vertical movement with the beam 38 as the supporting means therefor, and said bucket may have one or more links 47 which are pivoted, at 48, to the bed 42 and has its other end hooked and engaging a pin 49 on the bucket serving to steady the lower end thereof. The beam, as well as the means for supporting the beam, are substantially the same as that employed in connection with standard scales and may be of the usual or of any preferred construction.

As a means for controlling the flow of the material to the bucket 33, I provide a plurality of valves 50, 51 and 52. The valves 50 and 51 control the main or preliminary stream, and the valve 52 controls the finishing stream and is adapted to be moved by the valve 51 when the latter is opened, and while arranged to ride upon said valve 51, the valve 52 has an independent closing movement, as will be presently described. The valve 50 has arms 53 extending on opposite sides of the casing 26 which are pivoted at 54, and the valve 51 is provided with arms 55 also extending on opposite sides of the casing 26 and which are pivoted at 56. The arms 53 of the valve 50 and the arms 55 of the valve 51 intersect each other and are angularly arranged so that said valves may move away from or toward each other in the arc of a circle to close the opening 57 for the preliminary stream as it passes through the casing or throat 26, and said valves are of the gravity type and tend normally to move to a closed position, both of the valves 50 and 51 being cut away to fit about the conduit or pipe 18 of the finishing stream. A bar 58 is connected at the upper end thereof to an arm 59 extending inwardly from the pivot 54 of the valve 50, and a similar bar 60 is located on the opposite side of the throat 26 and is connected to an arm similar to the arm 59 extending inwardly from the pivot 56, so as to operate said valves to open the same when the said bars are moved upward. These bars 58 and 60 have V-shaped ends 61 which are adapted to be engaged by the blocks 62 carried by the inner end of the scale beam 38 when the bucket is in an elevated position or empty, in which case the said bars will cause the valves 50 and 51 to be forced outward to an open position thereby permitting the preliminary or main stream of the material to flow into the bucket 33 as soon as the slide 30 is moved outward. The valves 50 and 51 each have an angular portion 63 and on the angular portion of the valve 51 are one or more lugs 64 which are adapted to engage the inner portion 65 of the finishing valve 52. As will be seen when the valve 51 is opened through the movement of the bar 60, the valve 52 will also be opened to permit the finishing stream to also flow into the bucket 33, the said valve 52 being provided with arms 66 which are hinged or swung on the pivots 56 serving as the pivot of the valve 51. The valve 50 is provided with an upwardly-extending arm 67, Fig. 1, the upper end of which may be slotted, as at 68, to adjustably hold a counter-weight 69, and the arms of the valve 51 may also have an upwardly-extending arm 70, Fig. 1, the upper end of which may be T-shaped and slotted, as at 71, in which may be adjustably held a counter-weight 72. These counter-weights 69 and 72 may be variously adjusted and determine the pressure that is exerted against the action of the beam in opening the valves. As the beam raises the bars 58 and 60, the said bars will open the valves to permit the material to flow into the bucket and as soon as the weight of the material is sufficient to lower the bucket to bring the blocks 62 out of contact with the ends of the bars 60, the valves 50 and 51 will close to shut off the preliminary stream.

It is usual in machines of this class, to make the weighing of the material more exact and in order that the machine may work rapidly, to provide a finishing or drip stream and permit said stream to flow after the main stream has been cut off. This may be accomplished in various ways. As shown, a bell-crank lever 73 is held to the pivot 56 of the finishing valve 52, and on one end of said lever is a roll 74. An arm 75 extends outward from the arm 76 of the bell-crank lever, and on said arm is a boss or lug 77 through which projects a threaded stem 78. The threaded stem 78 engages a member 79 carried by the arm 66 and said threaded stem has a handle 80 by which the arm 75 and arm 66 of the valve may be moved closer together and thereby force the roll 74 in the arc of a circle to adjust said roll 74 relatively to the valve 52 in order to regulate the extent of opening the said valve shall have after the main valves 50 and 51 are closed. The lug 77 and member 79 may either or both move to permit the adjustment of the roll 74 and this roll and a trip 81 determine the extent of opening of the finishing valve 52. The trip 81 is pivoted at 82 to the casing or throat 26 and has a weighted handle, as at 83, to force the engaging end 84 upward into the path of movement of the roll 74. The inner end 84 of the trip 81 is beveled to engage the roll 74 which it will do when the roll 74 is moved outward through the opening of the valve 52, and when in the position shown in dotted lines in Fig. 5, the said trip will form a stop and limit the closing movement of the valve 52 until said trip is released, the said opening or stop movement of the valve 52 being determined by the relative position of the roll 74 and the closing end of the valve 52 through the adjustment, as already explained. A stop or pin 85 is provided for the trip 81, and this stop is eccentrically arranged to permit rotation thereof and serves when adjusted to properly position and limit the upward movement of the end of the trip. On the trip 81 is a pin 86 which is adapted to enter an opening 87 in the upper end of a vertically movable yoke bar or device 88. This bar or device 88 is carried by one of the bails 35 of the bucket 33 so as to rise and fall therewith, and when the bucket moves downward a certain distance, the upper end of the bar 88 will engage the pin and force the end 84 of the trip 81 downward to release the same from the roll 74, thus permitting the valve 52 to entirely close. One of the valve arms 66 is extended, as at 89, and has a slotted T-shaped portion 90 in which is adjustably held a counterweight 91, and said end 90 has a portion 92 adapted to engage a lug or stop 93 on the throat or casing 26, so as to limit the closing movement of the valve. The valve 52 extends somewhat below the valves 50 and 51, and the inner open part 94 thereof may be closed by the bristles 95 of a brush 96, the latter being held by a bracket 97 to the lower end of the valve 50. By this means the preliminary stream may be cut off entirely as the bucket lowers and the finishing stream permitted to flow for the proper length of time and then automatically actuated so that the finishing stream may be entirely cut off as the bucket with its weighed charge continues to lower. During the flow of the finishing stream, there is a certain amount of material moving into the bucket or which will be in transit at the time that the bucket has received its proper charge according to the weights 46, and to compensate for this the scale beam is provided with a bar 98 along which is adjustably movable a poise weight 99 which may be held to the bar by a set screw 100 or otherwise. This poise 99 by moving along the bar 98 compensates for the extra weight of the material or that which is in transit, and if not provided, an over weight would occur, the said poise 99 and its connection with the machine being common in machines of this class.

To discharge the material or weighed drafts either manually or automatically, and to hold the charge within the bucket until the discharge takes place, I provide two valves or doors 101 and 102. The bucket 33 is substantially rectangular in form and the valves 101 and 102 form an angular bottom for said bucket. These valves have their lower edges adapted to meet, as at 103, and the door 101 has sides 104 which are adapted to overlap the sides 105 of the door 102, the said bucket being provided with an extension 106 on two sides thereof corresponding to the angular arrangement and shape of the doors 101 and 102. The door 101 is provided with upwardly-extending portions 107 which are pivoted, at 108, to the sides of the bucket, and the door 102 is provided with upwardly-extending portions 109 which are pivoted, at 110, also to the opposite sides of said bucket. One or more weights 111 are adjustably held to the arms 107 and weights 112 are held to the arms 109, the said weights tending normally to force the doors 101 and 102 to a closed position. The counterweights 111 and 112 on the doors 101 and 102 are so located and proportioned as to raise the center of gravity of said doors to the highest possible point. That is to say the weights are located so that when adjusted around the pivot screws 113, the centers of said weights can be swung to either side of the vertical lines passing through the suspension studs or pivots 108, or the center of gravity of the weights can be made to coincide with the center of said suspension studs, thus the counter-weights may be adjusted to be absolutely neutral or non-effective or may be made to close or open the doors 101 and 102, as desired. If the weights are set so that their centers are on the outside of the vertical and slightly above a horizontal line drawn through the suspension studs or pivots 108, it will be seen that the doors will oscillate very quickly as a short pendulum will, thus discharging the weighed material and closing positively before the bucket 33 has moved far enough to open the valves 50, 51 and 52. By this means, it is not necessary to employ any kind of a locking device to hold the valves 50, 51 and 52 shut until the doors 101 and 102 are closed or any other device to hold the scale beam down at the bucket end until the doors are closed.

The doors 101 and 102 may be manually or automatically operated and for this purpose I provide on each side a lever or latch 115 which is pivoted, at 116, to the opposite sides of the door 101, and these latches 115 each has an off-set portion 117 adapted to move in a catch 118 so that when the doors 101 and 102 are moved to a closed position, the said latches 115 will automatically lock the same in this position against the weight of the load within the bucket until the said latches are released. A shaft 119 is held to rock in the brackets 120 and 120ª, the former bracket being supported by a normally stationary casing 121 serving as a means to catch the weighed drafts, and said casing has a funnel-shaped portion, as 122, and a removable member 123 serving to direct the material into the package, though any other suitable means may be employed. To the shaft 119 are held the arms 124 which project through openings 125 in the casing 121, and on the outer end of said arms are pins or engaging devices 126. These pins 126 are normally held stationary in the path of the outer ends of the latches 115 when the machine is adapted to work automatically, so that when the bucket 33 lowers, the said latches 115 will engage the pins to raise the latches and release the doors 101 and 102 to discharge the load therein. The shaft 119 has a lever 127 held thereto, and said lever has a handle portion 128 and an inwardly-extending arm 129 on which is a weight 130. This weight 130 has a lug 131 on the under side thereof which is adapted normally to rest upon a bracket 132 projecting outward from the frame 28, and said weight normally holds the arms 124 in a fixed position relatively to the latches 115. The shaft 119 has a longitudinal movement in its brackets 120 and 120ª so that by shifting the same laterally, the lug of the weight 130 may be moved free of the supporting member 133 of the bracket 132 so that the said weight on said lever may cause the pins 126 to be moved out of the path of the latches 115, in which case it will be necessary to move the handle 128 of lever 127 manually before the latches can be released to permit the weighed load to be discharged from the bucket 33. Thus the machine may weigh material automatically and discharge by manually operated means or said machine may be made to weigh and discharge the material automatically.

In some instances, and particularly in the weighing of certain classes of material, it sometimes happens that the valves or other parts become choked or for certain other reasons it may be desired to stop the machine quickly and hold the same against operation. For this purpose, a cam 134, Figs. 1 and 8, is pivotally held, at 135, to the frame 28, and this cam has an operating handle 136 by which the said cam may be thrown over so that it will force the bucket end of the beam downward and thus hold the same against upward movement. The cam carries a lug 137 a part of which projects farther than another part, and said lug is adapted to engage a projection or lug 138 carried by the frame when in one position, and to engage the lug 139 of said frame when moved to the opposite direction, thus limiting the movement of the cam in both directions, the position of the lugs being such that the cam will not interfere with the movement of other parts of the machine. The shaft 135 extends through the frame and is provided with a crank 140 which is connected to a bar 141, the lower end of which is slotted, as at 142, at the lower end thereof and engages a pin 143 carried by the weight 130 so that when the cam 134 is moved to a position to hold the beam and bucket down, it will act to raise the weight and arms 124 to automatically trip the latches and permit the doors 101 and 102 to open to discharge the material therein.

The machine is adapted for weighing material by utilizing the primary or preliminary stream in connection with the finishing stream, or for certain classes of material it may be necessary or desirable to weigh simply by the drip or finishing stream. In this case, the beam is held against an extreme movement so that it will not operate the valves 50 and 51, and to limit the movement of the bucket, a device 144 is pivoted at 145, Fig. 1, and is adapted to swing around and under the part 146 of the beam weight, a stop 147 being provided to limit the downward movement of the weighted end of the beam by engaging the part 146 with the end of the device 144. A spring or device 149, Figs. 3 and 5, is arranged so as to open the drip valve 52, the distance the said valve 52 is opened being determined by the relative position of the roll 74 and the inner end of the trip 81. The safety spring 149 comprises a looped portion 150 and an extending part or arm 151 which is held at its end to a pin 152 carried by the trip release bar 88 which is adapted to engage the pin 86 on the trip 81. The other end or arm 153 of said spring has a handle portion 154 and is adapted to be passed under the hooked portion 155 of a looped catch 156 carried by the said trip bar 88. When the trip or finishing stream is being used exclusively for weighing the material, the arm 153 of the spring is released from the hook 156, and said arm will engage the pin 86 of the trip 81 and will force the said trip upward so as to open and retain the finishing or drip valve 52 open until the said trip is released by the downward movement of the bucket through the bar 88 which will cause the valve 52 to suddenly close, the rest of the parts operating in substantially the same manner as already explained. The spring when in the position shown in Figs. 3 and 5, serves to prevent the premature closing of the valves 50 and 51 and serves to take up a certain amount of the shock or oscillatory movement of the beam on the recovery thereof which might serve to release the trip to permit the valves to close prematurely and particularly so when the machine is operating rapidly.

The operation of the machine will be readily understood from the foregoing description when taken in connection with the accompanying drawings.

Assuming the parts to be in the position shown with the cam 134 out of the path of movement of the scale beam 38 so that said beam is in balance and substantially free from friction, and the back stop or device 144 moved out of the path of the weighted end of the beam, it will be seen that if the units or loads are to be one pound, a one pound weight is placed in the pocket or weight-holding device 45 carried by one end of the beam. If everything is free the bucket end of the beam and bucket will rise and will open valves 50, 51 and 52 by engagement with the bars 58 and 60, as already described. The baffle plate or slide 30 may be opened all the way and this leaves the throat of the machine open and clear, and the weighted end of the trip lever 127 with the shaft 119 is moved laterally to bring the fingers or arms 124 out of engagement with the latches 115 carried by the bucket door 101. The one pound weight may be removed from the beam and the poise 99 set at zero. If the weighing bucket is empty, the beam 38 should oscillate evenly and freely. The movement of the shaft and hand trip lever 127 will prevent the bucket from discharging the contents except when the hand lever is manually operated. The device 80 is moved by the threaded end engaging the swivel nut or projection 79 to adjust the roll 74 properly with respect to the trip 81 and as soon as the bucket rises to open the valves as already explained, the bucket will receive a load and descend. The material is discharged into the receptacle or scoop 122 by means of the hand trip lever 127 and if the poise 99 is at zero, the load will probably weigh eighteen to eighteen and one-half ounces on account of a certain amount of the material being in transit during the weighing operation. This over weight may be corrected by moving the poise 99 to a point corresponding with the over weight of the load just weighed and there fastened securely. The load which in the meantime has run into the weighing bucket is discharged manually but not weighed as it will be similar to the first load. The load following should show the correct weight and if such correction is properly made, the weight should correspond with one pound, and if any variation occurs from the proper weight, this can be compensated for by moving the poise weight in the proper direction. The lever 127 and its weight 130 may be moved so as to rest upon the support 133 to bring the inner ends of the arms 124 in the path of the latches 115 for automatic weighing. As the bucket moves upward the valves 50, 51 and 52 will be opened, as already explained, and the material in a preliminary and a finishing or drip stream will flow into the bucket, and as soon as the bucket lowers the proper distance so that the inner end of the beam will be out of engagement with the bars 58 and 60, the said valves 50 and 51 will automatically close leaving the drip or finishing stream to continue to flow through the opening 94, the said valve 52 being held in an open position by means of engagement of the end of the trip 81 with the roll 74. The bucket continues to lower and on further movement the yoke end of the bar 88 will engage the pin of the trip 81 and force the same downward so as to free the valve 52 which will move to a closed position and by reason of the brush 96 will cut off the steam. As the bucket continues to lower the latches 115 will engage the pin 126 of the arms 24 and release the same from the catch 118, thus permitting the material to force the doors 101 and 102 open to discharge the load or draft in the scoop or receptacle 122 to direct the material into the containing package if desired, and immediately the load is discharged, the counterweights 111 and 112 will force the doors 101 and 102 back to their normal or closed position and the bucket will then be elevated by the weights in position to receive another load and to open the valves for the material to flow into the bucket. If it is desired to stop the machine entirely, the cam 134 may be forced over to throw the bucket end of the beam downward, and this will simultaneously open the doors 101 and 102 through the bar 141 to cause any load within the bucket to be discharged; and if it is desired to operate the machine with the finishing stream only, the device 144 is moved to the position shown in Fig. 1, and in this position will limit the upward movement of the bucket 33 so that the valves 50 and 51 will not be opened but only the finishing valve 52, thus the weighing can be accomplished with one or with two streams, as desired.

In Figs. 10 and 11, only two valves are employed, one for the drip or finishing stream, and the other for the primary or preliminary stream. In this case, the valve 157 is pivoted in substantially the same manner as already described, and the drip or finish valve 158 is also pivoted. The drip valve 158 is operated through a bar 159 which is connected to an arm 160 extending from the pivot shaft 161, said arm 160 being fast to, or may be formed as a part of said valve. The open end 162 of the drip valve 158 is adapted to be closed when in the position shown in Fig. 11, by the end 163 of a transversely-extending partition 164. This partition 164 extends transversely of the casing 165 and divides the same into a preliminary or primary conduit 166 and a finish or drip conduit 167. By providing the partition 164, the plate or cut-off portion 168 does not have to be made to fit about the pipe or conduit 167, but may be straight and engage directly with the surface of said partition 164. This serves to simplify somewhat the construction of the throat or casing 165.

From the foregoing, it will be seen that a simple and efficient weighing machine is provided which is adapted to operate entirely automatically and at a rapid speed without any power whatever; that said machine may be made to weigh various kinds of materials and various weights; that the machine is adapted to weigh in two streams simultaneously or only on one stream; that simple means is provided whereby the beam and bucket may be held against movement; that simple means is provided for supporting the bucket and for compensating for the weight of the material in transit; that effective valve mechanism and valves operated thereby are provided, the action of which is very simple and effective in operation; that simple means is provided for regulating the movement of the bucket; that an effective hopper is provided in which the material will assume its natural position when the machine is stopped for any purpose whatever, so that it is less likely to choke; that the material whatever its nature is properly guided and directed, and that said machine is not only simple in construction and may be readily made and assembled, but the said machine may be made so as to be portable or fixed, as desired.

Having thus described my invention, I claim as new and desire to secure by Letters Patent:—

1. The combination with feeding means, of a casing forming a throat for said feeding means and constructed to direct the material therethrough in two streams, oscillatory valves pivotally held to the casing and adapted to move toward or from each other, a bucket, means for suspending the bucket, means for positively operating certain of the valves as the bucket is elevated and to cause said valves to close when lowered, a valve for one of the streams movable to an open position by the movement of one of the first-mentioned valves and closed by an independent movement, and means whereby the said latter valve may be held open a certain distance and then automatically moved to a closed position.

2. The combination with feeding means, of a casing forming a throat for said feeding means and constructed to direct the material therethrough in two streams, oscillatory valves pivotally held to the casing and adapted to move toward or from each other, a bucket, means for suspending the bucket, means for positively operating the valves as the bucket is elevated and to cause said valves to close when lowered, a third valve for one of the streams movable to an open position by the movement of one of the first-mentioned valves and closed by an independent movement, means whereby the said latter valve may be held open a certain distance and then moved to a closed position, and means for discharging each weighed draft from the bucket.

3. The combination with means for feeding material in two streams, oscillatory valves adapted to move toward or from each other, a bucket, means for suspending the bucket, means for positively operating the valves to open the same, a valve for one of the streams, and means whereby the said latter valve may be held open a certain predetermined distance after the first-mentioned valves close and then moved to a closed position.

4. The combination with feedings means, of a casing constructed to direct the material therethrough in two streams, oscillatory valves pivotally held to the casing and adapted to move toward or from each other, a bucket, means for suspending the bucket, means for positively operating the valves to open the same as the bucket is elevated and to cause said valves to close when lowered, a third oscillatory valve for one of the streams, and means whereby the said latter valve may be held open a certain predetermined distance and then automatically moved to a closed position, and means for automatically discharging the weighed drafts from the bucket.

5. The combination with feedings means, of means for weighing the material, a plurality of valves having arms intersecting and pivotally held so as to move toward or from each other, a third pivoted valve movable to an open position with one of the other valves and to a closed position independent thereof, and means whereby the valves may be opened and closed.

6. The combination with feeding means dividing the material into two streams, one of which is a finishing stream, of two valves pivotally held adjacent to the feeding means and adapted to oscillate and to cut off or permit the flow of one of the streams, a third valve pivotally held and movable to an open position by one of the valves and adapted to close to cut off the finishing stream independently of the movement of the other valves, a bucket, weighted means for suspending the bucket, means positively operated by the upward movement of the bucket to open the first-mentioned valves and to permit the same to close as the bucket lowers, means whereby the third valve may be held partly open after the closing of the first-mentioned valves, means whereby said valve may be released on a further movement of the bucket to cut off the second stream, and means whereby the weighed drafts may be discharged.

7. The combination with feeding means dividing the material into two streams, one of which is a finishing stream, of two valves pivotally held adjacent to the feeding means and adapted to oscillate and to cut off or permit the flow of one of the streams, a third valve pivotally held and movable to an open position with one of the valves and adapted to close to cut off the finishing stream independently of the movement of the other valves, a bucket, means positively operated during the upward movement of the bucket to open the first-mentioned valves and to permit the same to close as the bucket lowers, means whereby the supplementary valve may be held partly open after the closing of the first-mentioned valves, means whereby said third valve may be released on a further movement of the bucket to cut off the second stream, and means whereby the weighed drafts may be automatically discharged.

8. The combination with feeding means dividing the material into two streams, one of which is a finishing stream, of two valves pivotally held adjacent to the feeding means and adapted to oscillate and to cut off or permit the flow of one of the streams, a third valve pivotally held and movable to an open position with one of the valves and adapted to close to cut off the finishing stream independently of the movement of the said valves, a receptacle, and means whereby the valves may be operated to cut off the streams in succession and independently.

9. The combination with a feed hopper, of a casing forming a throat therefor, a plurality of valves pivotally held to said casing, said valves having counter-balances, a weighing receptacle, means for discharging the weighed drafts, means for opening one of said valves independent of the upward movement of the weighing receptacle, and means whereby said valve may be automatically closed without any action on the part of the other valves.

10. The combination with a feed hopper, of a plurality of pivotally held valves, said valves having counter-balances, a weighing receptacle, means for discharging the weighed drafts, and means whereby one of the valves may be automatically closed subsequent to the closing of the other valves.

11. The combination with a hopper having means for dividing the flow of material into two streams, of weighing means for the material, a casing forming a throat for the hopper and having means for conducting the material in two streams therethrough, two valves each having arms which extend angularly so as to intersect, the said arms being pivoted on opposite sides of the casing and adapted to cause the valves to move toward or from each other to cut off the flow of one of the streams, counter-balancing means for said valves, bars connected to the valves and arranged in the path of the weighing means so as to automatically open the valves and to permit the same to close by the movement of said weighing means, a finishing valve pivoted to move with one of the other valves when opening and adapted to close by an independent movement, means for holding said finishing valve to close subsequently to the closing of the other valves, and means whereby the said finishing valve may be automatically moved to a closed position to cut off the finishing stream.

12. The combination with a hopper having means for dividing the flow of material into two streams, of weighing means for the material, a casing forming a throat for the hopper and having means for conducting the material in two streams therethrough, two valves each having arms which extend angularly so as to intersect, the said arms being pivoted on opposite sides of the casing and adapted to cause the valves to move toward or from each other to cut off the flow of one of the streams, counter-balancing means for said valves, and bars connected to the valves and arranged in the path of the weighing means so as to automatically open the valves and to permit the same to close by the movement of said weighing means, and a drip valve to cut off the other said stream.

13. The combination with a hopper having means for dividing the flow of material into two streams, of weighing means for the material, a casing forming a throat for the hopper and having means for conducting the material in two streams therethrough, valves having arms which extend angularly so as to intersect, the said arms being pivoted on opposite sides of the casing and adapted to cause the valves to move to cut off the flow of material, counter-balancing means for said valves, and means to automatically open the valves and permit the same to close, and a drip valve to cut off the other said stream.

14. The combination with a hopper having means for dividing the flow of material into two streams, of weighing means for the material, a casing forming a throat for the hopper and having means for conducting the material in two streams therethrough, two valves having arms which extend angularly so as to intersect, the said arms being pivoted on opposite sides of the casing and adapted to cause the valves to move toward or from each other to cut off the flow of one of the streams, means connected to the valves and arranged in the path of the weighing means so as to automatically open the valves and permit the same to close by the movement of said weighing means, a pivoted finishing valve, and means for holding said finishing valve to close subsequently to the closing of the other valves.

15. The combination with a hopper having means for dividing the flow of material into two streams, of weighing means for the material, a casing forming a throat for the hopper and having means for conducting the material in two streams therethrough, two valves having arms which extend angularly so as to intersect, the said arms being pivoted on opposite sides of the casing and adapted to cause the valves to move toward or from each other to cut off the flow of one of the streams, and means for cutting off the flow of the other stream.

16. The combination with a hopper having means for dividing the flow of material into two streams, of weighing means for the material, a casing forming a throat for the hopper and having means for conducting the material in two streams therethrough, two valves having arms which extend angularly so as to intersect, the said arms being pivoted to move toward or from each other to cut off the flow of one of the streams, counter-balancing means for said valves, a finishing valve, means for holding said finishing valve to close subsequently to the closing of the other valves, and means whereby the said finishing valve may move to a closed position to cut off the finishing stream.

17. The combination with a hopper having means for dividing the flow of material into two streams, of weighing means for the material, two valves pivoted on opposite sides of the streams and adapted to move toward or from each other to cut off the flow of one of the streams, counter-balancing means for said valves, bars connected to the valves and arranged in the path of the weighing means so as to automatically open the valves and permit the same to close by the movement of said weighing means, a third valve, and means whereby said valve may be made to close subsequently to the other valves.

18. The combination with a feed hopper having means to divide the material into a primary and a finishing stream, of means for controlling the primary stream, a valve for controlling the finishing stream, a casing forming a throat for the feed hopper and to which the said valve is pivoted, an arm projecting from said valve and having a counter-weight adjustable thereon tending normally to force the valve to a closed position, means for opening said valve, an arm, a roll carried by said arm, a trip bar to engage said roll and to hold the same to retain the valve in an open position, means for adjusting the roll relatively to the trip to vary the extent of opening of said valve, weighing means, and means whereby the trip may be automatically moved to release the valve and permit the same to close.

19. The combination with a feed hopper, of a valve for cutting off the flow of material, a casing forming a throat for the feed hopper and to which the said valve is pivoted, an arm projecting from said valve and having a counter-weight thereon tending normally to force the valve to a closed position, means for opening said valve, an arm, a roll carried by said arm, a trip bar to engage said roll and to hold the same to retain the valve in an open position, means for adjusting the roll relatively to the trip to vary the extent of opening of said valve, weighing means, and means whereby the trip may be moved to release the valve and permit the same to close.

20. The combination with a feed hopper having means to divide the material into a primary and a finishing stream, of means for controlling the primary stream, a valve for controlling the finishing stream, means tending normally to force the valve to a closed position, means for opening said valve, an arm, a roll carried by said arm, a trip adapted to engage said roll and to hold the same to retain the valve in an open position, weighing means, and means whereby the trip may be moved to release the valve and permit the same to close.

21. The combination with a feed hopper having means to divide the material into a primary and a finishing stream, means for controlling the primary stream, a valve for controlling the finishing stream, an arm projecting from said valve and having a counter-weight adjustable thereon tending normally to force the valve to a closed position, means for opening said valves, an arm, a trip device to hold the arm and retain the valve in an open position, weighing means, and means whereby the trip device may be automatically moved to release the valve and permit the same to close.

22. The combination with a casing, of a source of material supply, a valve pivotally held to said casing and movable in the arc of a circle, a trip pivotally held to the casing, a roll movable with the valve and adapted to be engaged by the trip to hold the valve in an open position, means for adjusting the roll relatively to the valve to vary the extent of opening of said valve, and means whereby the trip may be released to permit the valve to close.

23. The combination with a casing having means to divide the material into two streams, of valves for shutting off or permitting one of the streams to flow, a finishing valve for the other stream pivotally held to the casing, a bell-crank lever carried by said valve, counter-balancing means for said valve, a roll carried by said bell-crank lever, an arm projecting from said bell-crank lever, a projection having a threaded opening carried by the valve, a manually operated device having a threaded part engaging said threaded opening and adapted to give a relative movement to said roll with respect to the valve, a trip pivotally held to the casing and having a weighted portion and an end adapted to engage said roll, a pin projecting outward from said trip, a bar, a weighing receptacle operatively connected to said bar, the said bar having a slotted upper portion adapted to engage the pin of the trip and on the downward movement thereof to permit the valve to close, and a safety spring adapted to engage the pin of the trip carried by said bar.

24. The combination with a casing having means to divide the material into two streams, valves for shutting off or permitting one of the streams to flow, a valve for the other stream pivotally held to the casing, a bell-crank lever carried by said valve, counter-balancing means for said valve, a roll carried by said bell-crank lever, an arm projecting from said bell-crank lever, a manually operated device engaging a part of the valve and adapted to give a relative movement to said roll with respect to the valve, a trip pivotally held to the casing and having a weighted portion and an end adapted to engage said roll, a pin projecting outward from said trip, a bar, and a weighing receptacle operatively connected to said bar, the said bar having a slotted upper portion adapted to engage the pin of the trip and on the downward movement thereof to permit the valve to close.

25. The combination with a casing through which the material may flow, a valve pivotally held to the casing, a bell-crank lever carried by said valve, counter-balancing means for said valve, a roll carried by said bell-crank lever, means for adjusting the bell-crank and roll relatively to the valve, a trip pivotally held to the casing and having an end adapted to engage said roll, a pin projecting outward from said trip, a bar, a weighing receptacle operatively connected to said bar, the said bar having a slotted upper portion adapted to engage the pin of the trip and on the downward movement thereof to permit the valve to close, and a safety spring adapted to engage the pin of the trip carried by said bar.

26. The combination with a casing having means to divide the material into two streams, valves for shutting off or permitting one of the streams to flow, a valve for the other stream pivotally held to the casing, a bell-crank lever carried by said valve, a roll carried by said bell-crank lever, an arm projecting from said bell-crank lever, a manually operated device adapted to give a relative movement to said roll with respect to the valve, a trip pivotally held to the casing and having an end adapted to engage said roll, a pin projecting outward from said trip, a bar, and a bucket operatively connected to said bar, the said bar having a slotted upper portion adapted to engage the pin of the trip and on the downward movement thereof to permit the valve to close.

27. The combination with a casing having means to divide the material into two streams, valves for shutting off or permitting one of the streams to flow, a valve for the other stream pivotally held to the casing, a trip pivotally held to the casing and adapted to hold the valve normally open, a pin projecting outward from said trip, a bar, a weighing receptacle operatively connected to said bar, the said bar having a slotted upper portion adapted to engage the pin of the trip and on the downward movement thereof to permit the valve to close, and a safety spring adapted to engage the pin of the trip carried by said bar.

28. The combination with a casing through which the material may flow, a valve pivotally held to the casing, a trip pivotally held to the casing and adapted to hold the valve normally open, an adjustable stop to limit the movement of the trip in one direction, a pin projecting outward from said trip, a weighing receptacle, means movable with the receptacle adapted to release the trip, and a safety spring adapted to engage the pin of the trip.

29. The combination with a feed hopper, of a casing forming a throat for said hopper, an oscillatory valve pivotally held to said casing and adapted to swing in the arc of a circle, a trip to engage a part of said valve to hold the same in an open position, a bar adapted to operate said trip to release the same from the valve, a weighing receptacle adapted to receive the material as it passes through the casing, a safety spring carried by the bar and having a looped portion and two substantially parallel arms, one of which is held to said bar, a latch carried by the bar and adapted to hold the other arm, and means whereby the arm may be released and engage a part of the trip so as to force the valve to an open position.

30. The combination with a feed hopper, of a casing forming a throat for said hopper, an oscillatory valve pivotally held to said casing and adapted to swing in the arc of a circle, a trip to engage a part of said valve to hold the same in an open position, means adapted to operate said trip to release the same from the valve, a stop for the trip limiting its movement in one direction, a weighing receptacle adapted to receive the material as it passes through the casing, and a safety spring adapted to engage a part of the trip.

31. The combination with a feed hopper, of a casing forming a throat for said hopper, a valve pivotally held to said casing and adapted to swing in the arc of a circle, a trip to engage a part of said valve to hold the same in an open position, a bar adapted to operate said trip to release the same from the valve, a weighing receptacle connected to the bar and adapted to receive the material as it passes through the casing, a safety spring carried by the bar and having a looped portion and two substantially parallel arms, one of which is held to said bar, and a latch carried by the bar and adapted to hold the other arm.

32. The combination with a feed hopper, of a casing forming a throat for said hopper, of a valve pivotally held to said casing, a device to engage a part of said valve to hold the same in an open position, means adapted to operate said device to release the same from the valve, a bucket adapted to receive the material as it passes through the casing, and a safety spring having a looped portion and two substantially parallel arms one of which is adapted to engage the device.

33. The combination with a plurality of pivotally held and oscillatory valves movable in opposite directions to and from each other, a source of supply for the material, weighing means, a third valve movable with one of the valves to an open position and movable to a closed position independently of said valve, and a brush carried by one of the first-mentioned valves and adapted to close the open end of said third valve.

34. The combination with a plurality of pivotally held and oscillatory valves movable in opposite directions to and from each other, a source of supply for the material, means for dividing the material into two independent streams, weighing means, and a brush carried by one of the valves for one of the streams and adapted to close the open end of the valve for the other stream.

35. The combination with a casing having means for the passage of material therethrough, of a slide for shutting off the supply of material, a plurality of valves adapted to shut off or to control the flow of material through said casing, and a feed hopper comprising a funnel, a conduit leading from said funnel at one side thereof, a pan adapted to receive the material through said conduit, a second conduit, and a device located adjacent to the funnel and having an inclined bottom, the angle of which corresponds to the angle of natural slope of the material and leading to the second conduit whereby the choking of the material is prevented, and the overflow directed into the pan.

36. The combination with a casing having means for the passage of material therethrough, of a plurality of valves adapted to shut off the flow of material through said casing, and a feed hopper comprising a funnel, a conduit leading from said funnel at one side thereof, a second conduit, and a device located adjacent to the funnel and having means to cause the material when cut off to assume the natural angle of slope, whereby the choking of the material is prevented, and the overflow directed into the pan.

37. The combination with a casing having means for the passage of material therethrough, of a plurality of valves adapted to shut off the flow of material through said casing, and a feed hopper comprising a funnel, a conduit leading from said funnel at one side thereof, a second conduit, and a device located adjacent to the funnel and having an inclined bottom to cause the material to assume the natural angle of slope.

38. The combination with a weighing receptacle, of a casing located above said receptacle and adapted to conduct the material in two streams therethrough, a slide for shutting off one stream, a plurality of valves for controlling said streams independently, a feed hopper connected to said casing and comprising a pan, a casing arranged around said pan, a funnel, a conduit located at one side of the funnel and having an opening into said funnel at one end through which one stream may pass into the pan and casing, a second conduit for the finishing stream, a plate located adjacent to the finishing conduit and adapted to direct the material at one side thereof into the pan, a cylindrical device fitting about the throat of the funnel at one end and having a notched or cut-away portion above the finishing conduit, and provided with an inclined bottom to cause the material to assume the natural angle of slope.

39. The combination with a weighing receptacle, of a casing located above said receptacle and adapted to conduct the material therethrough, a plurality of valves for controlling the flow of said material, a feed hopper connected to said casing and comprising a funnel, a conduit located at one side of the funnel and having an opening into said funnel at one end through which a part of the material may pass, a second conduit for another part of the material, a cylindrical device fitting about the throat of the funnel at one end and having a notched or cut-away portion above the second conduit and provided with an inclined bottom and causing the material to assume the natural angle of slope when the flow is shut off.

40. A feed hopper comprising a pan, a casing arranged around said pan, a funnel, a conduit located at one side of the funnel and having an opening into said funnel at one end through which one stream of material may pass into the pan, a second conduit for a second stream, a cylindrical device fitting about the throat of the funnel at one end and having a notched or cut-away portion above the second conduit, and provided with means to cause the material to assume the natural angle of slope.

41. A feed hopper connected to said casing and comprising a funnel, a conduit located at one side of the funnel, a plate, a cylindrical device fitting about the throat of the funnel at one end and having a notched or cut-away portion above the conduit, and provided with an inclined bottom to cause the material to assume the natural angle of slope.

42. The combination with a weighing receptacle, of a casing located above said receptacle and adapted to conduct the material in two streams therethrough, a plurality of valves for controlling said streams independently, a feed hopper connected to said casing and comprising a funnel, a conduit located at one side of the funnel, a plate located adjacent to the conduit and adapted to direct the material at one side thereof, a cylindrical device fitting about the throat of the funnel at one end and having an inclined bottom to direct the material into said conduit.

43. The combination with a bucket, of a casing located above said bucket and adapted to conduct the material in two streams therethrough, a plurality of valves for controlling said streams independently, a feed hopper connected to said casing and comprising a pan, a funnel, a conduit located at one side of the funnel and having an opening into said funnel at one end through which one stream may pass into the pan, a second conduit, and means for directing the material into the second conduit.

44. The combination with a weighing receptacle, of a casing located above said receptacle and adapted to conduct the material in two streams therethrough, a plurality of valves for controlling said streams independently, a feed hopper connected to said casing and comprising a pan, a casing arranged around said pan, a funnel, a conduit located at one side of the funnel and having an opening into said funnel at one end through which one stream may pass into the pan and casing, a second conduit for the finishing stream, a plate located adjacent to the finishing conduit and adapted to direct the material at one side thereof in the pan, and means for directing the material from the funnel to the second conduit.

45. The combination with feeding means for the material, of valves for shutting off the flow of material, a beam, a receptacle supported by said beam and adapted to receive the material from the feeding means, means whereby the material may be weighed, means whereby the movement of the receptacle may open the valves, a rotatable cam normally held out of engagement with the beam and having a handle whereby the said cam may be rotated to force said beam and receptacle carried thereby downward, discharging means carried by the receptacle, a shaft, a rod, and a crank carried by the shaft and connected to said rod whereby when the cam is moved it will cause the discharging means of the bucket to open.

46. The combination with feeding means for the material, of valves for shutting off the flow of material, a beam, a receptacle supported by said beam and adapted to receive the material from the feeding means, means whereby the material may be weighed, means whereby the movement of the receptacle may open the valves, a rotatable cam normally held out of engagement with the beam and having a handle whereby the said cam may be rotated to force said beam and receptacle carried thereby downward, and discharging means carried by the receptacle.

47. The combination with feeding means for the material, of valves for shutting off the flow of material, a beam, a receptacle supported by said beam and adapted to receive the material from the feeding means, means whereby the movement of the receptacle may open the valves, a rotatable cam normally held out of engagement with the beam and adapted to force said beam and receptacle carried thereby downward, discharging means carried by the receptacle, and means operatively connected to the cam whereby when the cam is moved it will cause the discharging means of the bucket to open.

48. The combination with feeding means for the material, of valves for shutting off the flow of material, a beam, a receptacle supported by said beam and adapted to receive the material from the feeding means, means whereby the movement of the receptacle may open the valves, a cam normally held out of engagement with the beam and adapted to force said beam and receptacle carried thereby downward, discharging means carried by the receptacle, and a rod operatively connected to the cam and adapted to move the discharging means when the cam is operated.

49. The combination with feeding means, of a bucket, a beam for supporting said bucket, weights carried by said beam opposite the bucket, a supporting frame having lugs thereon, a cam having lugs adapted to engage the lugs of the frame, and means whereby the cam may be rotated to force the beam downward.

50. The combination with feeding means, of a bucket, a beam for supporting said bucket, weights carried by said beam opposite the bucket, a supporting frame having lugs thereon, a cam having lugs adapted to engage the lugs of the frame, means whereby the cam may be rotated to force the beam downward, and means operated by the cam whereby the contents of the bucket may be discharged when the cam is operated.

51. The combination with feeding means, of a bucket, a beam for supporting said bucket, weights carried by said beam opposite the bucket, a supporting frame having lugs thereon, a cam having lugs adapted to engage the lugs of the frame, means whereby the cam may be rotated to force the beam downward, discharging doors for the bucket, and mechanism operatively connected to the cam to open the doors when the cam is moved to force the beam downward.

52. The combination with a vertically movable bucket, of means for feeding material in fixed weights thereto, of two doors pivotally held to said bucket at the discharging end thereof, means normally holding the doors in a closed position, a shaft, arms projecting inward and arranged in the path of the means for holding the doors closed, means whereby the shaft may be given a longitudinal movement, a lever held to the shaft, a weight carried by one end of said lever, and a stationary support normally holding the weight in a raised position when the doors are to be opened automatically and to permit the weight to be moved to position the arms so that said arms must be operated manually before said doors can be opened.

53. The combination with a vertically movable bucket, of means for feeding material thereto, of means for closing the discharging end of said bucket, a shaft, supporting means for the shaft permitting a longitudinal movement, arms projecting inward and arranged in the path of the discharging means of the bucket, a lever held to the shaft, a weight carried by one end of said lever, and a stationary support normally holding the weight in a raised position when the discharging means is to be automatically operated and to permit the weight to be moved to position the arms so that said arms must be operated manually before said discharging means can be operated.

54. The combination with a vertically movable bucket, of means for feeding material thereto, of two doors pivotally held to said bucket at the discharging end thereof, means for normally holding the doors in a closed position, a longitudinally movable and rotary shaft, arms projecting inward and arranged in the path of the means for holding the bucket closed, and means for operating the shaft manually and automatically.

55. The combination with a vertically movable bucket, of means for feeding material thereto, of two doors pivotally held to said bucket at the discharging end thereof, means for normally holding the doors in a closed position, a shaft, means for supporting the shaft to permit longitudinal movement, arms projecting inward and arranged in the path of the means for holding the doors closed, a lever held to the shaft, and means for holding the arms in a raised position when the doors are to be opened automatically and to permit the arms to be moved to a position that said arms must be operated manually before said doors can be opened.

56. The combination with a vertically movable bucket, of means for feeding material thereto, of two doors pivotally held to said bucket at the discharging end thereof, means for normally holding the doors in a closed position, arms projecting inward and arranged in the path of the means for holding the bucket closed, and means whereby the arms may be moved to open the doors.

57. The combination with a vertically movable bucket, of means for feeding material thereto, of two doors pivotally held to said bucket at the discharging end thereof, means for normally holding the doors in a closed position, a shaft, means for supporting the shaft to permit longitudinal movement, arms projecting inward and arranged in the path of the means for holding the doors closed, a lever held to the shaft, and a stationary support normally holding the lever in a raised position when the doors are to be opened automatically and to permit the lever to be lowered to position the arms so that said arms must be operated manually before said doors can be opened.

58. The combination with a vertically movable bucket, of means for feeding material thereto, of a door pivotally held to said bucket at the discharging end thereof, means for normally holding the door in a closed position, a shaft, arms projecting inward and arranged in the path of the means for holding the door closed, means supporting the shaft so that it may be given a longitudinal movement, a lever held to the shaft, a weight carried by said lever, and a stationary support normally holding the weight in a raised position.

59. The combination with feeding means, of a vertically movable bucket, means for supporting said bucket, doors pivotally held and arranged to hold the material in said bucket, a shaft, arms projecting inward from said shaft, a latch carried by one of the doors of the bucket and adapted to engage said arms, a cam adapted to force the bucket in a lowered position, and means operatively connected to the cam whereby the arms may be raised to engage the latch and open the doors.

60. The combination with feeding means, of a vertically movable bucket, means for supporting said bucket, doors pivotally held and arranged to hold the material in said bucket, inwardly projecting arms, a latch carried by the doors of the bucket and adapted to engage said arms, a cam adapted to force the bucket to a lowered position, and means operatively connected to the cam whereby the arms may be raised to engage the latch and open the doors.

61. The combination with a vertically movable bucket, of a beam for supporting the same, means for pivotally holding the beam, means for dividing the material and for supplying the same to the bucket in two streams, said means comprising a plurality of valves, means for opening said valves, and means for opening one of the valves only and for limiting the upward movement of the bucket whereby only one of said valves and one of the streams may be utilized for weighing the material or both streams utilized.

62. The combination of a movable bucket, means for dividing the material and for supplying the same to the bucket in two streams, said means comprising a plurality of valves, and means for opening one of the valves and for limiting the upward movement of the bucket whereby only one of said valves and one of the streams may be utilized for weighing the material.

63. The combination of a movable bucket, means for dividing the material and for supplying the same to the bucket in two streams, said means comprising a plurality of valves, a spring for opening one of the valves, and a movable device for limiting the upward movement of the bucket whereby only one of said valves and one of the streams may be utilized for weighing the material.

64. The combination with a vertically movable bucket, of a beam for supporting the same, means for pivotally holding the beam weight-holding means supported by the beam on the opposite side of the pivot to that of the bucket, said weight-supporting means having a flange, means for controlling the supply of material to the bucket and comprising a plurality of valves, means for controlling the movements of the valves to open them together and permit them to close in sequence, a spring for opening one of the valves independently of the others, and a pivotally held device adapted to be moved under the weighted end of the beam to engage the flange and thereby limit the movement of the bucket whereby only one of the valves may be utilized in weighing the material.

65. The combination with a vertically movable bucket, of a beam for supporting the same, means for pivotally holding the beam, weight-holding means supported by the beam on the opposite side of the pivot to that of the bucket, means for supplying material to the bucket in two streams and comprising a plurality of valves, means for controlling the movement of the valves to cause them to open together and close in sequence, means for independently opening one of the valves, and a pivotally held device adapted to be moved under the weighted end of the beam to limit the movement of the bucket whereby only one of the streams may be utilized.

66. The combination with a vertically movable bucket, of a beam for supporting the same, means for pivotally holding the beam, weight-holding means supported by the beam on the opposite side of the pivot to that of the bucket, means for supplying material to the bucket in two independent streams and comprising a plurality of valves for independently shutting off the streams, means for controlling the movement of the valves to cause them to open together and close in sequence, means for independently opening one of the valves, and a pivotally held device adapted to limit the movement of the bucket whereby only one of the streams may be utilized.

67. The combination with a frame, of a feed hopper having means for dividing the material in two streams, one a primary and the other a finishing stream, means for controlling the primary stream, a valve for controlling the finishing stream, a bucket, a beam for supporting the bucket, means for supporting the beam, weighted means arranged on one side of the pivot opposite the bucket, said valve being controlled by the movement of the bucket, means for opening the valve for the finishing stream, and a device adapted to limit the movement of the beam and bucket whereby only the finishing valve will be operated and the finishing stream used.

68. The combination with a frame, of a feed hopper having means for dividing the material in two streams, one a primary and the other a finishing stream, means for controlling the primary stream, a valve for controlling the finishing stream, a bucket, a beam for supporting the bucket, means for supporting the beam, weighted means arranged on one side of the pivot opposite the bucket, said valve being controlled by the movement of the bucket, a spring for opening the valve for the finishing stream, and a pivoted device adapted to limit the movement of the beam and bucket whereby only the finishing valve will be operated and the finishing stream used.

69. In a weighing machine, the combination of a feeding chute divided at its lower end into two parts, a pair of valves movable across the end of one part only, and a third valve arranged to close the other part.

70. In a weighing machine, the combination of a feeding chute divided at its lower end into two parts, a pair of valves movable across the end of one part to close the part only, and a third valve arranged to close the other part, means for simultaneously operating said pair of valves, and means for operating the third valve.

71. In a weighing machine, the combination of a feeding chute divided at its lower end into two parts, a pair of valves movable across the end of one part and a third valve arranged to close the other part, a brush carried by one of the pair of valves and coöperating with the third valve to close the said part.

72. In a weighing machine, the combination of a feeding chute divided at its lower end into two parts, a pair of valves movable across the end of one part, and a third valve arranged to close the other part, a brush carried by one of the pair of valves and coöperating with the third valve to close the said part, the brush having its bristles extending toward and engaging the edge of the third valve and extending in the direction of the path of movement of the third valve.

73. In a weighing machine, the combination of a feeding chute divided at its lower end into two parts by means of a tube containing a smaller tube within the same, a pair of valves movable across the ends of the tubes to close the larger tube only, and a third valve arranged to close the smaller tube.

74. In a weighing machine, the combination of a feeding chute divided at its lower end into two parts by means of a tube containing a smaller tube within the same, a pair of valves movable across the ends of the tubes to close the larger tube only, and a third valve arranged to close the smaller tube, means for simultaneously operating said pair of valves, and means for operating the third valve.

75. In a weighing machine, the combination of a feeding chute divided at its lower end into two parts by means of a tube containing a smaller tube within the same, a pair of valves movable across the ends of the tubes to close the larger tube only, and a third valve arranged to close the smaller tube, one of said pair of valves having a part arranged to coöperate with the third valve to open the smaller tube.

76. In a weighing machine, the combination of a feeding chute divided at its lower end into two parts by means of a tube containing a smaller tube within the same and projecting below the other tube, a pair of valves movable across the ends of the tubes to close the larger tube only, and a third valve arranged to close the smaller tube.

77. In a weighing machine, the combination of a feeding chute divided at its lower end into two parts by means of a tube containing a smaller tube within the same and projecting below the other tube, a pair of valves movable across the ends of the tubes to close the larger tube only, and a third valve arranged to close the smaller tube, one of said pair of valves having a part arranged to coöperate with the third valve to open the smaller tube.

78. In a weighing machine, the combination of a feeding chute divided at its lower end into two parts by means of a tube containing a smaller tube within the same, a pair of valves movable across the ends of the tubes to close the larger tube only, and a third valve arranged to close the smaller tube, a brush carried by one of the pair of valves and coöperating with the third valve to close the inner tube.

79. In a weighing machine, the combination of a feeding chute divided at its lower end into two parts by means of a tube containing a smaller tube within the same, a pair of valves movable across the ends of the tubes to close the larger tube only, and a third valve arranged to close the smaller tube, a brush carried by one of the pair of valves and coöperating with the third valve to close the inner tube, the brush having its bristles extending toward and engaging the edge of the third valve, and extending in the direction of the path of movement of the third valve.

80. In a weighing machine, the combination of a feeding chute divided at its lower end into two parts by means of a tube containing a smaller tube within the same, a pair of valves movable across the ends of the tubes to close the larger tube only, and a third valve arranged to close the smaller tube, the third valve being engaged by one of the other valves to be shifted to the open position.

81. In a weighing machine, the combination of a feeding chute divided to produce two adjacent streams, a pair of valves pivoted to swing together and apart transversely of the chute to close one of the streams only when brought together, a third valve pivoted concentric with one of said valves and arranged to shut off the other stream.

82. In a weighing machine, the combination of a feeding chute divided to produce two adjacent streams, a pair of valves pivoted to swing together and apart transversely of the chute to close one of the streams only when brought together, a third valve pivoted concentric with one of said valves and arranged to shut off the other stream, said valve being engaged by its said concentric valve to be opened thereby.

83. In a weighing machine, the combination of a bucket, a valve member pivoted at the lower part of the bucket to close the same, and a balance weight on the valve shiftable to have its center of gravity brought to coincide with the center of oscillation of the valve.

84. In a weighing machine, the combination of a bucket, a pair of valves pivoted to swing together to close the outlet of the bucket, each of the valves being provided with a balance weight shiftable to have its center of gravity brought to coincide with the center of oscillation of the valve.

85. In a weighing machine, the combination of a bucket, a pair of valves pivoted to swing together to close the outlet of the bucket, each of the valves having a balance weight pivoted thereon to swing and bring its center of gravity to coincide with the center of oscillation of the valve.

86. In a weighing machine, the combination of a chute, a valve controlling the outlet of the chute, a weighing bucket to receive the material from the chute, a bar connected with the bucket to be advanced when the bucket receives a certain amount of material, a trip lever arranged to engage a part of said valve to shift the valve and retain it in open position, a device carried by said bar and arranged when in one position to engage the trip lever and hold it in position to open the valve and retain it open for a part of the movement of the bar, and means for holding the safety device in a position to be free from engagement with the trip lever.

87. In a weighing machine, the combination of a chute, a valve controlling the outlet of the chute, a weighing bucket to receive the material from the chute, a bar connected with the bucket to be advanced when the bucket receives a certain amount of material, a trip lever arranged to engage a part of said valve to shift the valve and retain it in open position, a device secured to said bar and having a resilient arm arranged to engage said trip lever to retain it in position to open the valve and hold it open for a part of the movement of the bar of the arm, and a latch arranged to engage the spring arm and hold it out of position for engagement with the trip lever.

88. In a weighing machine, the combination of a chute, a valve controlling the outlet of the chute, a weighing bucket to receive the material from the chute, a bar connected with the bucket to be advanced when the bucket receives a certain amount of material, a trip lever arranged to engage a part of said valve to shift the valve and retain it in open position, a device arranged in one position to engage the trip lever and hold it in position to open the valve and retain it open for a part of the movement of the bar, and means for holding the safety device in a position to be free from engagement with the trip lever.

89. In a weighing machine, the combination of a chute, a valve controlling the outlet of the chute, a weighing bucket to receive the material from the chute, a bar connected with the bucket to be advanced when the bucket receives a certain amount of material, a trip lever arranged to engage a part of said valve to shift the valve and retain it in open position, a device having a resilient arm arranged to engage said trip lever to retain it in position to open the valve and hold it open for a part of the movement of the bar, and a latch arranged to engage the spring arm and hold it out of position for engagement with the trip lever.

90. In a weighing machine, the combination with a chute, of a pair of valves pivoted to swing together to partly close the chute, said valves being arranged to swing to the closed position when released, a movable bucket arranged to receive material from the chute, means for causing the bucket when empty to hold said valves in the open position and to release the valves permitting them to close upon the bucket receiving a predetermined amount of material from the chute, a third swinging valve coöperating with said valves to entirely close the chute, means to swing the third valve to closed position when released, a trip device coöperating with said third valve to hold it in the open position, and means for shifting the trip device by the said movement of the bucket that causes the release of the other valves whereby the third valve is permitted to close.

91. In a weighing machine, the combination with a chute, of a pair of valves pivoted to swing together to partly close the chute, said valves being arranged to swing to the closed position when released, a movable bucket arranged to receive a material from the chute, means for causing the bucket when empty to hold said valves in the open position and to release the valves, permitting them to close upon the bucket receiving a predetermined amount of material from the chute, a third swinging valve coöperating with said valves to entirely close the chute, means to swing the third valve to closed position when released, a trip device coöperating with said third valve to hold it in the open position, and means for shifting the trip device by the said movement of the bucket that causes the release of the other valves whereby the third valve is permitted to close, the release of the third valve by the bucket being effected by a further advance in the said movement of the bucket after the release of the said other valves.

92. In a weighing machine, the combination with a chute, of a pair of valves pivoted to swing together, to partly close the chute, said valves being arranged to swing to the closed position when released, a movable bucket arranged to receive material from the chute, means for causing the bucket when empty to hold said valves in the open position and to release the valves permitting them to close upon the bucket receiving a predetermined amount of material from the chute, a third swinging valve coöperating with said valves to entirely close the chute, means to swing the third valve to closed position when released, a trip device coöperating with said third valve to hold it in the open position, and means for shifting the trip device by the said movement of the bucket that causes the release of the other valves whereby the third valve is permitted to close, the release of the third valve by the bucket being effected by a further advance in the said movement of the bucket after the release of the said other valves, and means for causing the opening of the pair of valves to open the third valve.

93. In a weighing machine, the combination with a chute, divided at its lower end into two parts, of a pair of valves pivoted to swing together to close one part of the chute, said valves being arranged to swing to the closed position when released, a movable bucket arranged to receive material from the chute, means for causing the bucket when empty to hold said valves in the open position and to release the valves permitting them to close upon the bucket receiving a predetermined amount of material from the chute, a third swinging valve coöperating with said valves to close the other part of the chute, means to swing the third valve to closed position when released, a trip device coöperating with said third valve to hold it in the open position, and means for shifting the trip device by the said movement of the bucket that causes the release of the other valves whereby the third valve is permitted to close.

94. In a weighing machine, the combination with a chute, divided at its lower end into two parts, of a pair of valves pivoted to swing together to close one part of the chute, said valves being arranged to swing to the closed position when released, a movable bucket arranged to receive material from the chute, means for causing the bucket when empty to hold said valves in the open position and to release the valves, permitting them to close upon the bucket receiving a predetermined amount of material from the chute, a third swinging valve coöperating with said valves to close the other part of the chute, means to swing the third valve to closed position when released, a trip device coöperating with said third valve to hold it in the open position, and means for shifting the trip device by the said movement of the bucket that causes the release of the other valves whereby the third valve is permitted to close, the release of the third valve by the bucket being effected by a further advance in the said movement of the bucket after the release of the said other valves.

95. In a weighing machine, the combination with a chute divided at its lower end into two parts, of a pair of valves pivoted to swing together, to close the chute, said valves being arranged to swing to the closed position when released, a movable bucket arranged to receive material from the chute, means for causing the bucket when empty to hold said valves in the open position and to release the valves permitting them to close upon the bucket receiving a predetermined amount of material from the chute, a third swinging valve coöperating with said valves to close the other part of the chute, means to swing the third valve to closed position when released, a trip device coöperating with said third valve to hold it in the open position, and means for shifting the trip device by the said movement of the bucket that causes the release of the other valves whereby the third valve is permitted to close, the release of the third valve by the bucket being effected by a further advance in the said movement of the bucket after the release of the said other valves, and means for causing the opening of the pair of valves to open the third valve.

96. In a weighing machine, the combination of a chute, a pair of valves pivoted to swing together to partly close the chute, said valves being arranged to swing to the closed position when released, a bucket arranged to receive material from the chute, means for causing the bucket when empty to hold said valves in the open position and to release the valves permitting them to close upon the bucket receiving a predetermined amount of material from the chute, a third swinging valve coöperating with said valves to entirely close the chute, means to swing the third valve to closed position when released, a trip lever coöperating with said third valve to hold it in the open position, a bar connected with the bucket, a safety device on the bar having a safety device arranged to engage said trip lever to retain it in position to open the third valve and hold it open for a part of the movement of the bar, and a latch arranged to engage the spring arm and hold it out of position for engagement with the trip lever.

97. In a weighing machine, the combination of a chute, a pair of valves pivoted to swing together to partly close the chute, said valves being arranged to swing to the closed position when released, a bucket arranged to receive material from the chute, means for causing the bucket when empty to hold said valves in the open position and to release the valves permitting them to close upon the bucket receiving a predetermined amount of material from the chute, a third swinging valve coöperating with said valves to entirely close the chute, means to swing the third valve to closed position when released, a trip lever coöperating with said valve to hold it in the open position, a bar connected with the bucket, a safety device on the bar having a resilient arm arranged to engage said trip lever to retain it in position to open the third valve and hold it open for a part of the movement of the bar, and a latch arranged to engage the spring arm and hold it out of position for engagement with the trip lever.

98. In a weighing machine, the combination with a chute, of a pair of valves pivoted to swing together to close one part of the chute, said valves being arranged to swing to a closed position when released, a movable bucket arranged to receive material from the chute, means for causing the beam when the bucket is empty to hold said valves in an open position and to release the valves permitting them to close when the bucket receives a predetermined amount of material from the chute, and a third swinging valve coöperating with said valves to cause a final closure of the chute.

This specification signed and witnessesd this fourteenth day of April, A. D. 1910.

HAYWOOD GUION DEWEY.

Witnesses:
JOHN L. CAIR,
CARY D. HALL, Jr.

Copies of this patent may be obtained for five cents each, by addressing the "Commissioner of Patents, Washington, D. C."